United States Patent [19]

Cooley

[11] 3,883,357
[45] May 13, 1975

[54] LASER GLASS HOST COMPOSITIONS COMPRISING $TeO_2$, $La_2O_3$ AND ZnO

[75] Inventor: Richard F. Cooley, Toledo, Ohio

[73] Assignee: Owens-Illinois, Inc., Toledo, Ohio

[22] Filed: June 27, 1973

[21] Appl. No.: 374,229

[52] U.S. Cl....... 106/47 R; 106/47 Q; 252/301.4 F; 252/301.6 R; 252/301.6 F
[51] Int. Cl.............................................. C03c 3/28
[58] Field of Search. 252/301.6 S, 301.4 S, 301.4 F, 252/301.4 R; 106/47 Q, 47 R

[56] References Cited
UNITED STATES PATENTS

| | | | |
|---|---|---|---|
| 3,423,326 | 1/1969 | Redman | 252/301.6 S |
| 3,487,025 | 12/1969 | Natansohn | 252/301.6 S |
| 3,503,006 | 3/1970 | Hoskins et al. | 252/301.4 R |
| 3,527,711 | 9/1970 | Barber et al. | 252/301.4 F |
| 3,723,600 | 3/1973 | Redman | 252/301.4 S |

Primary Examiner—Winston A. Douglas
Assistant Examiner—John F. Niebling
Attorney, Agent, or Firm—Richard D. Heberling; E. J. Holler

[57] ABSTRACT

Laser glass compositions are disclosed that provide laser articles with increased efficiency, the compositions comprising $TeO_2$, $La_2O_3$ and ZnO in certain molar amounts, as defined by certain areas set forth in a ternary diagram of the FIGURE, the laser glass compositions also including an effective lasing amount of $Nd_2O_3$. Also disclosed are methods of making highly efficient glass laser articles, such as rods, discs and the like, the methods including the steps of:

1. melting laser glass batch-forming materials to provide molten glass comprising certain molar amounts of $TeO_2$, $La_2O_3$ and ZnO, the molten glass capable of being a host for an effective lasing amount of $Nd_2O_3$;

2. forming a glass laser blank from the molten glass; and 3. fabricating a laser article from the glass blank, the article having increased lasing efficiency.

Also disclosed is the new use of a $TeO_2/La_2O_3/ZnO$ glass host composition as a glass laser article in which the proportions of $TeO_2$, $La_2O_3$ and ZnO are present in certain molar amounts as above-described, and in which the glass composition is a host for an effective lasing amount of $Nd_2O_3$, the new use including the steps of:

1. forming a laser article from the glass composition above-described;

2. pumping the laser article to cause an energy inversion; and 3. passing monochromatic light through the article to cause stimulated emission at a wavelength of about 1.06 microns.

14 Claims, 1 Drawing Figure

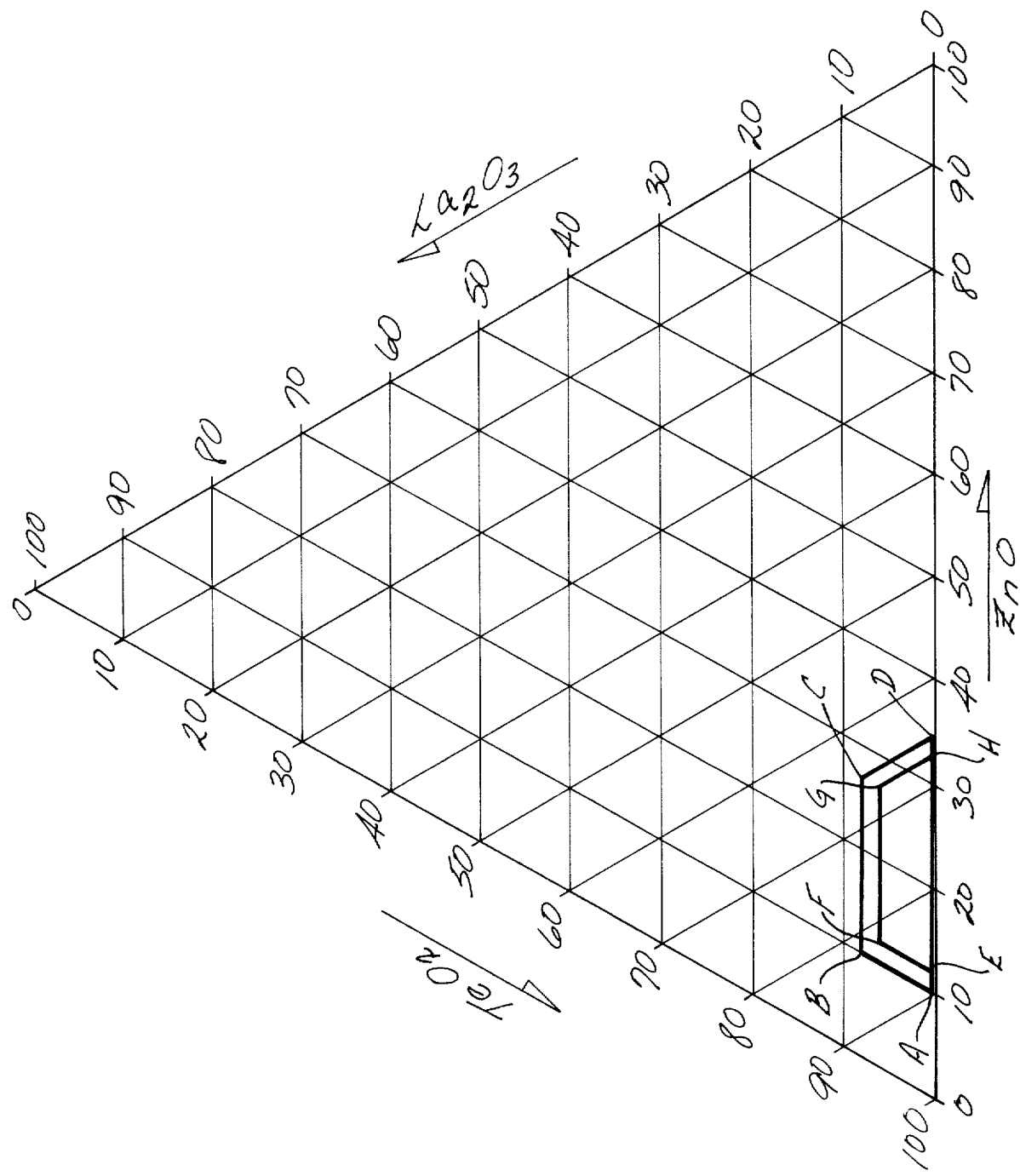

LASER GLASS HOST COMPOSITIONS COMPRISING $TeO_2$, $La_2O_3$ AND ZnO

This invention relates to laser glass compositions comprising a glass host containing $TeO_2$, $La_2O_3$ and ZnO in certain molar amounts, the laser glass being a host for an effective lasing amount of $Nd_2O_3$. The present invention also relates to methods of making the laser glass compositions including forming outstanding laser glass articles from the compositions. The present invention also relates to the new use for a glass laser composition in which the glass contains certain molar amounts of $TeO_2$, $La_2O_3$ and ZnO and in which the glass composition is a host for an effective lasing amount of $Nd_2O_3$, the new use including the steps of:

1. forming a laser article from the glass composition containing $TeO_2$, $La_2O_3$ and ZnO;
2. pumping the resultant laser article to cause an energy inversion; and
3. lasing the pumped article.

It is highly desirable to provide laser glass compositions that can be used to make outstanding highly-efficient glass laser articles. It is also desirable to provide methods for making the laser articles and the new use for glass compositions comprising $TeO_2$, $La_2O_3$ and ZnO, in which the new use includes the steps of:

1. forming a glass laser article from the abovedescribed glass composition that is a host for an effective lasing amount of $Nd_2O_3$;
2. pumping the laser article; and thereafter
3. lasing the pumped article.

It is an object of the present invention to provide a laser glass composition comprising $TeO_2$, $La_2O_3$ and ZnO in which the proportions in molar amounts of $TeO_2$, $La_2O_3$ and ZnO are defined by the area within the heavy lines connecting the points ABCD of the ternary diagram of the Figure, and in which the glass is a host for an effective lasing amount of $Nd_2O_3$.

It is an object of the present invention to provide a laser glass composition that makes highly-efficient laser articles, the composition comprising a host glass containing $TeO_2$, $La_2O_3$ and ZnO, with certain molar amounts that are defined by the area connecting the points EFGH in the ternary diagram, the host glass containing an effective lasing amount of $Nd_2O_3$.

It is an object of the present invention to provide a method for making a glass laser article comprising the steps of:

1. melting laser glass batch-forming materials to provide a molten glass comprising $TeO_2$, $La_2O_3$ and ZnO, in which the proportions thereof, in moles, are defined by the area within the heavy lines connecting the points ABCD of the ternary diagram, and an effective lasing amount of $Nd_2O_3$;
2. forming a glass laser blank from the molten glass; and
3. fabricating the laser article from the glass blank.

It is an object of the present invention to provide a method for making highly-efficient glass laser articles such as rods and discs, etc., the method comprising the steps of:

1. melting laser glass batch-forming materials to provide a molten glass containing $TeO_2$, $La_2O_3$ and ZnO, in which the proportions thereof are defined by the area within the heavy lines connecting the points EFGH of the ternary diagram, the molten glass capable of functioning as a host for an effective lasing amount of $Nd_2O_3$;
2. forming a glass laser blank from the molten glass; and
3. fabricating a laser article from the glass blank.

It is an object of the present invention to provide the new use for a $TeO_2/La_2O_3/ZnO$ glass composition as a glass laser article in which the proportions of $TeO_2$, $La_2O_3$ and ZnO are defined in a general range by the area within the heavy lines connecting the points ABCD and are defined in a preferred range within the heavy lines connecting the points EFGH of the ternary diagram of the Figure of the drawings, and in which the glass composition is a host for an effective lasing amount of $Nd_2O_3$, the new use comprising the steps of:

1. forming a laser article from the glass composition above-described;
2. pumping the laser article to cause an energy inversion; and
3. passing monochromatic light through the article to cause stimulated emission at a wavelength of about 1.06 microns.

It is an object of the present invention to provide a glass laser article made by forming a glass laser blank from molten glass comprising $TeO_2$, $LaO_3$ and ZnO, the molar proportions of $TeO_2 La_2O_3$ and ZnO being defined by the area within the heavy lines connecting the points ABCD of the ternary diagram of the Figure, and in which the molten glass is capable of being a host for an effective lasing amount of $Nd_2O_3$; and fabricating a laser article from the glass laser blank, the article having increased lasing efficiency.

These and other objects will be apparent from the specification that follows, the appended claims, and the drawings, in which the Figure is a ternary diagram of the glass host composition of the present invention in which the molar proportions of $TeO_2$, $La_2O_3$ and ZnO are defined by the area within the heavy lines of the ternary diagram.

The present invention provides laser glass host compositions for making outstanding laser glass articles, the host compositions containing an effective lasing amount of $Nd_2O_3$, and comprising $TeO_2$, $La_2O_3$ and ZnO in certain molar amounts that are defined in a general range by the area within the heavy lines connecting the points ABCD of the ternary diagram of the Figure of the drawings. The preferred range of the molar amounts of $TeO_2$, $La_2O_3$ and ZnO are defined by the area within the heavy lines connecting the points EFGH of the ternary diagram.

The present invention provides a laser glass composition comprising:

1. a host glass containing about 65–89.8 mole percent $TeO_2$, about 0.2–8 mole percent $La_2O_3$, and about 10–34.8 mole percent ZnO; and
2. an effective lasing amount of $Nd_2O_3$.

The present invention also provides a laser glass host composition comprising about 67–87.8 mole percent $TeO_2$, about 0.2–6 mole percent $La_2O_3$, and about 12–32.8 mole percent ZnO, the host composition containing about 0.01–1.5 mole percent $Nd_2O_3$.

The present invention also provides methods for making efficient glass laser articles, such as rods or discs, the methods including:

1. melting laser glass batch-forming materials to provide a moltenglass comprising $TeO_2$, $La_2O_3$ and ZnO, in which the molar amounts thereof are defined in a general range by the area within the heavy lines connecting the points ABCD of the ternary diagram of the Figure, and in which the molten glass is capable of being a host for an effective lasing amount of $Nd_2O_3$;

2. forming a glass blank from the molten glass; and
3. fabricating the outstanding laser article from the blank.

The present invention also provides the new use for a glass composition as a highly efficient glass laser article in which the glass comprises $TeO_2$, $La_2O_3$ and ZnO, and in which composition the molar amounts of $TeO_2$, $La_2O_3$ and ZnO are defined in a general range within the area formed by the heavy lines connecting the points ABCD of the ternary diagram, and in which the glass composition is a host for an effective lasing amount of $Nd_2O_3$, the new use comprising the steps of:

1. forming a glass laser article from the glass composition comprising $TeO_2$, $La_2O_3$ and ZnO with an effective lasing amount of $Nd_2O_3$;
2. pumping the laser article to provide an energy inversion; and
3. lasing the pumped laser article.

A zinc tellurite glass consisting essentially of a major molar proportion of $TeO_2$ and about 20 to 40 molar percent of ZnO is described in the Redman U.S. Pat. No. 3,423,326. These zinc tellurite glasses were reported as having some fluorescent activity when doped with $Nd_2O_3$.

As previously indicated, the outstanding laser glass host compositions of the present invention unexpectedly exhibit much higher fluorescent activity than the zinc tellurite glasses of the Redman patent, the increased fluorescent activity indicating a greater lasing efficiency for laser articles made from the host compositions of the present invention. As previously described, only certain molar proportions of $TeO_2$, $La_2O_3$ and ZnO can be used to provide highly efficient glass laser rods and discs. The increase in fluorescent activity is generally at least about 50% and preferably at least about 60 or 70% over any of the zinc tellurite glasses of the Redman patent. The increase is at least 100% when compared to the working examples of the Redman patent.

There is no mention of any glass system in the Redman patent other than a glass host composition consisting essentially of tellurium oxide and zinc oxide. There is no suggestion in the Redman patent that highly efficient laser articles can be made from a host composition containing certain molar proportions of $TeO_2$, $La_2O_3$ and ZnO.

In accordance with the present invention, increased lasing efficiency is obtained for glass laser rods and discs. The increase in fluorescent activity is surprisingly greater in that the articles of the present invention exhibit an activity of at least about 50% over that of a zinc tellurite glass containing approximately 65 mole percent $TeO_2$ and 35 mole percent ZnO (see the Redman patent), and at least about 50% over that of a lithiacalcia-alumino silicate glass laser rod as set forth, for instance, in U.S. Pat. No. 3,471,409, to Lee and Rapp, the laser rod being of the following composition:

| Ingredients | Mole Percent |
|---|---|
| $SiO_2$ | 60 |
| $Al_2O_3$ | 2.5 |
| $Li_2O$ | 27.5 |
| CaO | 10 |
| $Nd_2O_3$ | 0.5 |

In general, the highest fluorescent intensity value for a zinc tellurite glass, as above-described, containing 35 mole percent ZnO, is about 2.09 when compared to the fluorescent intensity value of the above-described lithia-calcia-alumino silicate glass laser, which is the reference glass arbitrarily held to be 1.0.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent | | Weight Percent | |
|---|---|---|---|---|
| | Host Glass | Laser Article | Host Glass | Laser Article |
| $TeO_2$ | 85.0 | 84.3 | 87.4 | 85.9 |
| ZnO | 12.0 | 11.9 | 6.3 | 6.2 |
| $La_2O_3$ | 3.0 | 3.0 | 6.3 | 6.2 |
| $Nd_2O_3$ | — | 0.8 | — | 1.7 |

The slurry was mixed for 10 minutes and poured into a gold crucible. The crucible was placed in an air circulating oven with the temperature maintained at 110°C. overnight to remove the water. The crucible was then placed in an electric resistance furnace with the temperature at 750°C. for 3 hours, or until homogenous, after which the molten glass immediately poured into a preheated (260°C.) graphite mold forming a disc having an 11/16 inch diameter and ¼ inch thickness. The graphite mold was placed in an annealing oven maintained at 340°C. After 1 hour, at 340°C., the temperature of the annealing oven was lowered at a rate of 38°C. per hour to 250°C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.13.

PART B

The polished glass disc from Part A was tested for fluorescence intensity and decay time in a high power pulsed test system. The disc was placed in a holder and exposed to a beam of light from an EG & G model FX 12-25 xenon flash lamp. The flash lamp had a flash duration of about 20 microseconds. The disc was not observed to solarize after repeated excitation by the flash lamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S–1 photomultiplier, having a narrow band pass filter.

The fluorescence intensity measurement was normalized against ED–2, a glass laser composition of Owens-Illinois, Inc., comprising, in mole percent, 60.0% $SiO_2$, 2.5% $Al_2O_3$, 27.5% $Li_2O$, 10% $CaO$, 0.16% $CeO_2$ and 0.5% $Nd_2O_3$, disclosed in U.S. Pat. No. 3,471,409, as Example 1. The fluorescence intensity was found to be 3.25 when normalized against the glass laser composition; 3.25 times the intensity of the glass laser composition.

The fluorescence intensity was corrected for the refractive indices of the glass disc and the reference glass laser composition by $$\text{FI (corrected)} = \text{FI (normalized)} \frac{(1.56)^2}{(\eta \text{ glass disc})^2}$$

The corrected fluorescence intensity was 1.74. The fluorescence decay time was 138 microseconds.

EXAMPLE 2

Part A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 77.0 | 76.4 | 77.5 | 76.1 |
| ZnO | 16.0 | 15.9 | 8.3 | 8.1 |
| $La_2O_3$ | 7.0 | 6.9 | 14.2 | 14.1 |
| $Nd_2O_3$ | — | 0.8 | — | 1.7 |

The refractive index of the finished polished glass disc was measured to be 2.08.

Part B

The polished glass disc from Part A was tested for fluorescence intensity and decay time as described in Part B of Example 1. The normalized fluorescence intensity was 3.0 and the corrected fluorescence intensity was 1.69. The fluorescence decay time was 140 microseconds.

EXAMPLE 3

Part A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 75.0 | 74.4 | 78.4 | 77.2 |
| ZnO | 20.0 | 19.8 | 10.8 | 10.5 |
| $La_2O_3$ | 5.0 | 5.0 | 10.8 | 10.5 |
| $Nd_2O_3$ | — | 0.8 | — | 1.7 |

The refractive index of the finished polished glass disc was measured to be 2.07.

Part B

The polished glass disc from Part A was tested for fluorescence intensity and decay time as described in Part B of Example 1. The normalized fluorescence intensity was 3.26 and the corrected fluorescence intensity was 1.85. The fluorescence decay time was 140 microseconds.

EXAMPLE 4

Part A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 70.0 | 69.5 | 75.3 | 74.0 |
| ZnO | 25.0 | 24.8 | 13.8 | 13.5 |
| $La_2O_3$ | 5.0 | 5.0 | 11.0 | 10.8 |
| $Nd_2O_3$ | — | 0.8 | — | 1.7 |

The refractive index of the finished polished glass disc was measured to be 2.06.

Part B

The polished glass disc from Part A was tested for fluorescence intensity and decay time as described in Part B of Example 1. The normalized fluorescence intensity was 3.53 and the corrected fluorescence intensity was 1.87. The fluorescence decay time was 140 microseconds.

Other specific compositions disclosed herein as being suitable for use in the laser compositions of the present invention can be substituted for the specific laser compositions used in the working examples to provide substantially equivalent results. For instance, any of the host compositions set forth within the area formed by the heavy lines connecting the points ABCD of the ternary diagram can be used in place of any of the specific laser compositions used in the working examples. Thus, a host glass comprising about 70 mole percent $TeO_2$, 27 mole percent ZnO and 3 mole percent $La_2O_3$ can be used for the specific host composition set forth in Example 1. Likewise, a laser glass host composition comprising about 72 mole percent $TeO_2$, 3 mole percent $La_2O_3$ and 25 mole percent ZnO, as well as a glass host comprising about 68 mole percent $TeO_2$, about 7 mole percent $La_2O_3$ and about 25 mole percent ZnO, can be used in place of the host composition of Example 1 to provide substantially equivalent results.

What is claimed is:

1. A laser glass composition comprising $TeO_2$, $La_2O_3$ and ZnO, the proportions of $TeO_2$, $La_2O_3$ and ZnO in molar amounts being defined by the area within the heavy lines, connecting the points ABCD of the ternary diagram of the Figure, the laser glass composition including an effective lasing amount of $Nd_2O_3$ for stimulated emission at a wavelength of about 1.06 microns.

2. A laser glass composition as defined in claim 1 in which the proportions of $TeO_2$, $La_2O_3$ and ZnO are within the area formed by the heavy lines connecting the points EFGH in the ternary diagram of the Figure of the drawing.

3. A laser glass composition consisting essentially of:
   1. a host glass containing about 65–89.8 mole percent $TeO_2$, about 0.2–8 mole percent $La_2O_3$, and about 10–34.8 mole percent ZnO; and
   2. an effective lasing amount of $Nd_2O_3$.

4. A laser glass host consisting essentially of about 67–87.8 mole percent $TeO_2$, about 0.2–6 mole percent $La_2O_3$, and about 12–32.8 mole percent ZnO, the host composition containing about 0.01–1.5 mole percent $Nd_2O_3$.

5. A laser glass composition as defined in claim 3 in which the host glass comprises about 70 mole percent $TeO_2$, 27 mole percent ZnO, and 3 mole percent $La_2O_3$.

6. A laser glass composition as defined in claim 3 in which the glass host comprises about 72 mole percent $TeO_2$, 3 mole percent $La_2O_3$, and 25 mole percent ZnO.

7. A laser glass composition as defined in claim 3 in which the glass host comprises about 68 mole percent $TeO_2$, about 7 mole percent $La_2O_3$, and about 25 mole percent ZnO.

8. A method for making a glass laser article such as a rod, disc and the like, the method comprising the steps of:
   1. melting laser glass batch-forming materials to provide a molten glass comprising $TeO_2$, $La_2O_3$ and ZnO in which the proportions thereof are defined by the area within the heavy lines connecting the points ABCD of the ternary diagram of the Figure of the drawings, and an effective lasing amount of $Nd_2O_3$ for stimulated emission at a wavelength of about 1.06 microns;
   2. forming a glass blank from the molten glass; and
   3. fabricating a laser article from the glass blank, the article having increased lasing efficiency.

9. A method as defined in claim 8 in which the glass comprising $TeO_2$, $La_2O_3$ and ZnO has amounts thereof defined by the area within the triangle connecting the points EFGH of the ternary diagram of the Figure of the drawing.

10. The new use for a $TeO_2/La_2O_3/ZnO$ glass composition as a glass laser article in which the proportions of $TeO_2$, $La_2O_3$ and ZnO are defined by the area within the heavy lines connecting the points ABCD in the ternary diagram in the Figure of the drawings and in which the glass composition is a host for an effective lasing amount of $Nd_2O_3$, the new use comprising the steps of:
   1. forming a laser article from the glass composition defined in claim 1;
   2. pumping the laser article to cause an energy inversion; and
   3. passing monochromatic light through the article to cause stimulated emission at a wavelength of about 1.06 microns.

11. A laser glass article made from the composition defined in claim 1.

12. An article as defined in claim 11 in the form of a rod.

13. An article as defined in claim 11 in the form of a disc.

14. A laser glass article made according to the composition defined in claim 1 in which the laser glass composition has the proportions of $TeO_2$, $La_2O_3$ and ZnO that are within the area formed by the heavy lines connecting the points EFGH in the ternary diagram of the figure of the drawing.

* * * * *